June 4, 1940. W. H. LEE 2,203,162
MILLING ATTACHMENT FOR MACHINE TOOLS
Filed May 12, 1939
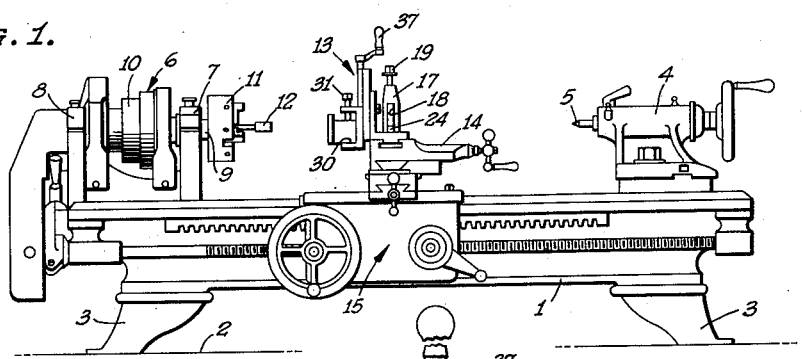
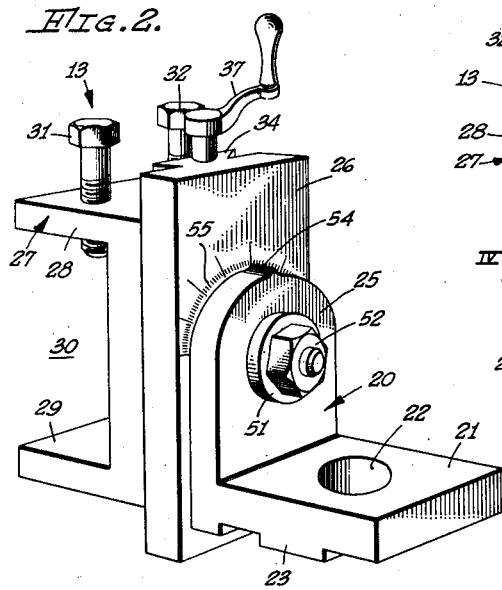
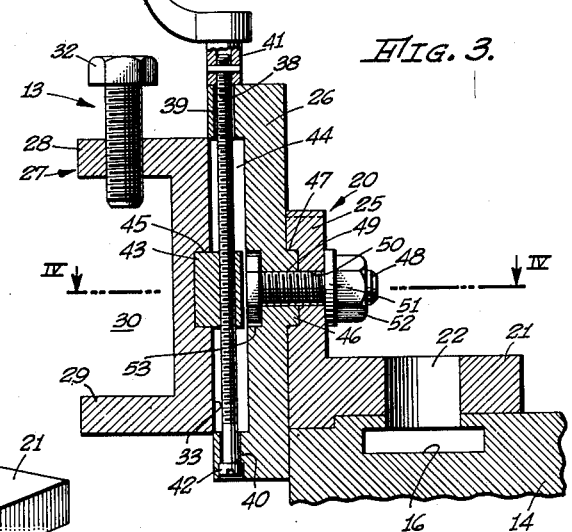
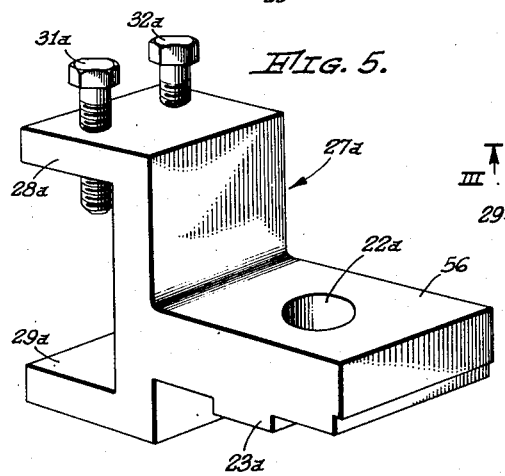
INVENTOR.
WILLIAM H. LEE
BY Harold W. Mattingly
ATTORNEY.

Patented June 4, 1940

2,203,162

UNITED STATES PATENT OFFICE 2,203,162

MILLING ATTACHMENT FOR MACHINE TOOLS

William H. Lee, Los Angeles, Calif.

Application May 12, 1939, Serial No. 273,259

9 Claims. (Cl. 90—59)

My invention relates to milling attachments for machine tools and has particular reference to a milling attachment to be supported by the tool post of machine tools and finds particular utility when employed with small engine lathes.

The scope of machine work which may be performed on various types of machine tools has been broadened in the past by the provision of so-called milling attachments which, in general, comprise a means for supporting a work-piece upon the bed of the machine in cooperative relation with a milling tool which is supported by the chuck or collet ordinarily used to support the work-piece in the machine.

These milling attachments, in general, and particularly those designed for use with engine lathes, are ordinarily mounted upon the tool carriage in place of the compound rest. This is a disadvantage in that considerable work is entailed in removing the compound rest from the machine in order to permit installation of the milling attachment and also in that the additional motion afforded by the compound rest is, by this means, eliminated.

It is therefore an object of my invention to provide a milling attachment for machine tools which may be supported upon the compound rest by the tool holder forming a part of such machines.

It is also an object of my invention to provide a milling attachment of the character set forth in the preceding paragraph which includes means cooperating with the tool post of a machine tool for securing the attachment to the compound rest thereof and which includes means for supporting a work-piece on said compound rest.

It is also an object of my invention to provide a milling attachment of the character set forth in the preceding paragraphs in which additional means is provided for vertical adjustment of the work-piece holder.

It is also an object of my invention to provide a milling attachment of the character set forth in the preceding paragraphs which includes means permitting rotational adjustment of the work-piece holder about a horizontal axis.

It is a further object of my invention to provide a milling attachment for small engine lathes which may be installed on such a lathe with the same facility as a conventional lathe tool may be installed thereon by providing an attachment having means to be engaged by the tool holder of such a lathe.

Other objects and advantages of my invention will be apparent from a study of the following specifications, read in connection with the accompanying drawing, wherein:

Fig. 1 is an elevation illustrating the general appearance of a small engine lathe of the bench type on which is installed a milling attachment of my invention;

Fig. 2 is an enlarged perspective view illustrating the appearance and some of the details of construction of the preferred form of milling attachment illustrated in Fig. 1;

Fig. 3 is a vertical longitudinal section through the milling attachment illustrated in Fig. 2 and substantially along the line III—III of Fig. 4;

Fig. 4 is a horizontal section taken substantially along the line IV—IV of Fig. 3 to illustrate additional details of construction; and Fig. 5 is a perspective view similar to Fig. 2 but illustrating the appearance and details of construction of an alternative form of milling attachment.

Referring to the drawing, I have illustrated in Fig. 1 a conventional form of bench type engine lathe which ordinarily includes a bed 1 supported a convenient height above a work surface or bench top 2 by means of a plurality of standards or short legs 3. The bed 1 slidably supports a tail stock structure 4 which is adapted to carry a lathe center 5 to be used in conjunction with a lathe head stock 6 for supporting a work-piece or cutting tool for rotation about an axis extending longitudinally along the bed 1. The head stock 6 comprises a pair of standards 7 and 8 secured to the upper surface of the lathe bed 1 in which is journaled a lathe spindle 9. Rotary motion may be imparted to the lathe spindle 9 by means of pulleys 10 or other suitable driving means.. The spindle 9 is ordinarily provided with a face plate or chuck 11 which is employed during the conventional use of the machine to hold a work-piece and transmit thereto the rotation of the spindle 9.

When the milling attachment of my invention is used, however, the chuck 11 is used for supporting a milling cutter 12 which is to be employed for cutting a work-piece carried by my milling attachment illustrated generally in Fig. 1 at 13. The milling attachment is supported in a manner to be described hereinafter upon a compound rest 14 forming a part of a carriage 15 which is mounted upon the lathe bed 1 for slidable movement therealong. The compound rest 14 is provided at its upper surface with a T slot 16 into which is inserted the T-shaped lower end of a tool post 17. The tool post 17 has an elongated aperture 18 therethrough and a set screw 19 vertically disposed thereabove and is threadedly engaged with the tool post 17 so that a lathe tool inserted through the aperture 18 may be clamped by means of the set screw 19.

The preferred form of my invention, as illustrated in Fig. 2, includes an angle bracket portion 20 having a horizontally disposed leg 21 through which is formed a bore 22 adapted to receive the tool post 17. The under surface of the horizontal leg 21 is preferably provided with a downwardly extending tongue 23 whose width is substantially equal to the width of the constricted portion of the T slot 16 so that the horizontal leg 21 of the angle bracket 20 may be placed upon the upper surface of the compound rest 14 with the tool post 17 extending upwardly through the bore 22, the angle bracket 20 being restrained against rotation about a vertical axis by the engagement of the tongue 23 with the constricted portion of the T slot 16. The angle bracket 20 may be clamped against the upper surface of the compound rest 14 by reversing the customary tool post wedge 24 so that its plane surface is directed downwardly and bears against the upper surface of the horizontal leg 21 of the angle bracket 20 and by screwing the set screw 19 firmly against the convex upper surface thus presented.

It will be observed that the milling attachment is accordingly very readily secured to the compound rest 14 by merely removing the tool holder ordinarily installed in the tool post 17 and placing the angle bracket 20 on the compound rest 14 in its stead.

The angle bracket 20 also includes an upwardly extending arm portion 25 which carries a supporting plate 26 upon which is slidably secured a work holder 27. The work holder 27 may be advantageously constructed along the lines illustrated in Figs. 2 and 3 and comprise a C-shaped member having horizontally extending upper and lower legs 28 and 29 defining an interior work holding recess 30. The work-piece to be secured in the work holder 27 may be secured within the recess 30 by employing a pair of set screws 31 and 32 threadedly engaged with the upper leg portion 28 of the work holder 27 to clamp the work-piece against the lower leg portion 29 thereof.

I prefer to slidably secure the work holder 27 to the supporting plate 26 for movement in a vertical direction and provide means for adjusting the vertical position of the work holder 27. Such slidable mounting may be achieved in the manner illustrated in Figs. 3 and 4 in which the rearward face of the work holder 27 is provided with a dovetail groove 33 having a substantially trapezoidal cross section and adapted to receive a corresponding dovetail rib 34 formed on the forward face of the supporting plate 26.

The rib 34 is preferably made narrower than the groove 33 in which it is received, the additional space therein being filled with a removable gib 35. One or more set screws 36 may be threaded into the base portion of the work holder 27 in a position to engage the side of the gib 35 so as to force it sidewise into engagement with the rib 34. Adjustment of the set screws 36 accordingly provides a greater or less clearance for the rib 34 within the groove 33 so that the ease with which the work holder 27 may be moved relative to the supporting plate 26 may by this means be adjusted. Furthermore, if desired, the set screws 36 may be employed to lock the work holder 27 in any desired position relative to the supporting plate 26.

In order to facilitate the adjustable positioning of the work holder 27 relative to the supporting plate 26, I provide a handle means 37 which may be non-rotatably secured to a feed screw 38 by means of a pinned threaded connection thereto. The feed screw 38 is preferably supported for rotation in the supporting plate 26 by means of upper and lower journals 39 and 40. The feed screw 38 is held against axial movement by a hub portion 41 of the handle member 37 and by a head portion 42 formed on the lower end of the feed screw 38.

Rotation of the feed screw 38 may be translated into a vertical sliding movement of the work holder 27 by providing a travelling nut 43 which is non-rotatably received in a vertically extending groove 44 formed in the rib portion 34 of the supporting plate 26. The travelling nut 43 extends forwardly and into engagement with a correspondingly shaped recess 45 formed on the rearward face of the work holder 27 so that rotation of the feed screw 38 will move the travelling nut 43 vertically within its slot 44 and by reason of its engagement with the recess 45 transmit this movement into sliding movement of the work holder 27 along the dovetail rib 34 of the supporting plate 26.

Attention is called to the fact that the work holding device 27 may be dis-associated from the supporting plate 26 for the purpose of cleaning, repairing, or mounting a work-piece therein by loosening the set screws 36 and sliding the gib 35 endwise out of the space in which it is received. The additional clearance thus afforded the rib 34 permits the work holder 27 to be moved forwardly a sufficient distance to remove the travelling nut 43 from the recess 45 in which it is received. This separates the connection securing the work holder 27 to the supporting plate 26, allowing it to be readily moved vertically along the dovetail guides and completely removed from the supporting plate 26. The work holding device may accordingly be readily installed by reversing the above described operation.

Reference has been made hereinbefore to the supporting plate 26 being secured upon an upstanding leg 25 of the angle bracket 20. In order to permit more universal adjustment of the position of the work holder 27 relative to the lathe bed 1 and the tool 12 supported for rotation thereover, I prefer to pivotally secure the supporting plate 26 thereto for movement about a horizontal axis. This support is, in the preferred form of my invention, constructed along the lines illustrated in Figs. 3 and 4 and comprises a cylindrical boss 46 formed upon the rearward surface of the supporting plate 26 in a position to be received in a correspondingly shaped cylindrical recess 47 formed in the forward face of the upstanding leg 25 of the supporting bracket 20. Axial movement of the boss 46 and the supporting plate 26 secured thereto relative to the upstanding leg 25 may be prevented by passing a threaded stud or bolt 48 through aligned bores 49 and 50 provided in the supporting plate 26 and the upstanding leg 25. A suitable thrust washer 51 and nut 52 may be employed to clamp the supporting plate 26 to the upstanding leg 25. In case the threaded member 48 comprises a bolt, the head thereof may be disposed in a recess 53 formed in the bottom of the longitudinally extending guide groove 44.

Axial angular positioning of the work holder 27 may be readily determined by providing an index or pointer 54 on the upper edge of the upstanding angle bracket leg 25 in a position cooperating with a protractor scale 55 etched or inscribed in the rearward face of the supporting plate 26.

It will be observed that the angular position of the supporting plate 26 and the work holder 27 carried thereby may be readily altered by loosening the nut 52 and that once the desired position of the supporting plate 26 has been set as indicated by the index 54 and protractor scale 55, a tightening of the nut 52 will operate to securely lock the work holder 27 in such desired position.

I have illustrated in Fig. 5 a modified form of milling attachment which finds considerable utility in those applications where vertical adjustment of the work holder relative to the lathe bed and angular adjustment of the work holder about a horizontal axis is of little or no importance.

In this form of my invention a work holding device 27a is made with substantially the same contour as the work holding device 27 previously described and includes upper and lower horizontally extending legs 28a and 29a and set screws 31a and 32a. The work holding device 27a is preferably formed integrally with a horizontally extending base portion 56 which is constructed along the lines and performs the same functions as the horizontally extending leg portion 21 of the previously described angle bracket 20. The base portion accordingly includes a bore 22a and a transversely extending rib 23a adapted to cooperate with the T slot 16 in the compound rest 14 and the tool post carried therein in the same fashion as previously described in connection with the preferred form of my invention.

From the foregoing, it will be apparent that I have provided a milling attachment for machine tools which is particularly adapted for use with small engine lathes and which may be readily attached or detached therefrom with the same facility as an ordinary cutting tool is secured to a compound rest of such a machine tool.

It will also be observed that in the preferred form of my invention I have provided a milling attachment which takes advantage of the additional motions and adjustments provided by the compound rest in contra-distinction to previous types of milling attachments in which the compound rest must be removed in order to permit installation of the attachment.

It will also be observed that the milling attachment of my invention provides a novel means for disassociating the work holding device from the supporting plate on which it is secured so as to permit ready and easy removal thereof for the purpose of cleaning, adjusting, or securing a work-piece therein.

Attention is also called to the fact that the milling attachment of my invention is of exceedingly simple construction and accordingly may be cheaply and inexpensively manufactured, thus permitting the manufacture and sale of a milling attachment for small bench type engine lathes at a cost commensurate with the advantages to be derived from its use in contra-distinction to previous constructions in which, in most cases, the cost of a milling attachment is prohibitive as regards their use on small inexpensive lathes.

While I have shown and described the preferred embodiment of my invention, I do not desire to be limited to any of the details of construction shown or described herein, except as defined in the appended claims.

I claim:

1. In a milling attachment for use on a machine tool having a compound rest and a tool post insertable in a T slot in said compound rest, the combination of: a base member; rib means formed on the under side of said base member and engageable with said T slot; an opening through said base member for receiving said tool post to permit clamping of said base member to said compound rest by said tool post; a work holding device secured to said base member; and means on said work holding device for securing a work-piece thereto.

2. In a milling attachment for use on a machine tool having a compound rest and a tool post insertable in a T slot in said compound rest, the combination of: a base member; rib means formed on the under side of said base member and engageable with said T slot; an opening through said base member for receiving said tool post to permit clamping of said base member to said compound rest by said tool post; a vertically disposed supporting plate; means mounting said supporting plate on said base member for pivotal movement about a horizontally disposed axis; a work holding device including means for securing a work-piece therein; a coacting dovetail groove and rib formed on said supporting plate and said work holding device for mounting said work holding device on said supporting plate for slidable movement relative thereto; a feed screw mounted on said supporting plate for rotation relative thereto about an axis disposed substantially parallel to said dovetail groove and rib; and a travelling nut on said feed screw engageable with said work holding device for translating rotation of said feed screw into sliding movement of said work holding device.

3. In a milling attachment for use on a machine tool having a compound rest and a tool post insertable in a T slot in said compound rest, the combination of: an angle bracket supporting member having a substantially horizontally disposed leg and an upwardly extending leg; rib means formed on the under surface of said horizontal leg for engagement with said T slot; an opening through said horizontal leg for receiving said tool post and permitting clamping of said horizontal leg to said compound rest by said tool post; a vertically disposed supporting plate; means mounting said supporting plate upon said upstanding bracket leg for pivotal movement about a horizontally disposed axis including a cylindrical boss formed on said supporting plate and adapted to be received within a cylindrical recess formed in said upstanding leg; a work holding device including means for securing a work-piece therein; means mounting said work holding device on said supporting plate for sliding movement in a direction substantially normal to said horizontal axis including a dovetail groove and rib construction formed on said work-piece and on said supporting plate; a feed screw mounted in said supporting plate for rotation about an axis disposed substantially parallel to said dovetail groove and rib construction; and a travelling nut threadedly engaged with said feed screw and received in a recess formed in said work-piece, whereby rotation of said feed screw is translated into sliding movement of said work-piece relative to said supporting plate.

4. In a work holding device, the combination of: a supporting plate; a dovetail rib formed on one surface of said supporting plate; a work holding device including means for securing a work-piece therein; a dovetail groove formed in one face of said work holding device for loosely receiving said dovetail rib; a removable gib insertable in said dovetail groove with said dovetail rib for filling said groove; a channel formed in said rib and extending longitudinally relative thereto; a travelling nut mounted in said channel for sliding movement therealong; a feed screw mounted on said supporting plate for rotation about an axis disposed parallel to said rib and threadedly engaged with said travelling nut; and a shallow recess formed in the bottom of said dovetail groove for receiving said travelling nut and transmitting to said work holding device longitudinal movement of said travelling nut.

5. In a milling attachment for use on a machine tool having a compound rest, and a tool post insertable in a T slot in said compound rest, the combination of: a base member; rib means formed on the underside of said base member and engageable with said T slot; an opening through said base member for receiving said tool post to permit clamping of said base member to said compound rest by said tool post; a vertically disposed supporting plate secured to said base member; a work holding device including means for securing a work-piece therein; a coacting dovetail groove and rib formed on said supporting plate and said work holding device for mounting said work holding device on said supporting plate for slidable movement relative thereto; a feed screw mounted on said supporting plate for rotation relative thereto about an axis disposed substantially parallel to said dovetail groove and rib; and a travelling nut on said feed screw engageable with said work holding device for translating rotation of said feed screw into sliding movement of said work holding device.

6. In a milling attachment for use on a machine tool having a compound rest and a tool post insertable in a T slot in said compound rest, the combination of: a base member; a tongue formed on the underside of said base member and engageable with said T slot; an opening through said base member for receiving said tool post to permit clamping of said base member to said compound rest by said tool post; a vertically disposed supporting plate secured to said base member; a dovetail rib formed on one surface of said supporting plate; a work holding device including means for securing a work-piece therein; a dovetail groove formed in one face of said work holding device for loosely receiving said dovetail rib; a removable gib insertable in said dovetail groove with said dovetail rib for filling said groove; a channel formed in said rib and extending longitudinally relative thereto; a travelling nut mounted in said channel for sliding movement therealong; a feed screw mounted on said supporting plate for rotation about an axis disposed parallel to said rib and threadably engaged with said nut; and a shallow recess formed in the bottom of said dovetail groove for receiving said travelling nut and transmitting to said work holding device longitudinal movement of said nut.

7. In a milling attachment for use on a machine tool having a compound rest and a tool post insertable in a T slot in said compound rest, the combination of: a work holding device including a base portion integral therewith and a means for clamping a work-piece therein; a rib means formed on the underside of said base portion having a width substantially equal to the width of said T slot; and an opening through said base member for receiving said tool post to permit clamping thereof to said compound rest by said tool post.

8. In a milling attachment for use on a machine tool having a compound rest and a tool post insertable in a T slot in said compound rest, the combination of: a work holding device comprising a C-shaped clamp member having substantially horizontally disposed and forwardly projecting upper and lower legs; means on one of said legs for clamping a work-piece against the other of said legs; a horizontally rearwardly extending base portion formed integrally with said clamp member; a rib means formed on the underside of said base portion having a width substantially equal to the width of said T slot; and an opening through said base member for receiving said tool post to permit clamping thereof to said compound rest.

9. In a milling attachment for use on a machine tool having a compound rest, a tool post insertable in a T slot in said compound rest, and a tool key passed through a tool receiving slot in said tool post against which a tool may be clamped by a tool holding set screw in said tool post, the combination: a work holding device including a base portion integral therewith and a means for clamping a work-piece therein; a rib means formed on the underside of said base portion having a width substantially equal to the width of said T slot; and an opening through said base member and said rib means having a diameter substantially equal to the diameter of said tool post, whereby said base member may be passed over said tool post with said rib means engaging said T slot and clamped thereon by passing said tool key through said tool receiving slot and clamping it against said base portion with said set screw.

WILLIAM H. LEE.